(12) United States Patent
Garriga et al.

(10) Patent No.: US 9,252,549 B2
(45) Date of Patent: Feb. 2, 2016

(54) METHOD FOR MAKING A POWER CONNECTION

(71) Applicants: Rudolph Garriga, Los Altos, CA (US); Michael Kubic, Mountain View, CA (US)

(72) Inventors: Rudolph Garriga, Los Altos, CA (US); Michael Kubic, Mountain View, CA (US)

(73) Assignee: CLEAN WAVE TECHNOLOGIES, INC., Mountain View, CA (US)

( * ) Notice: Subject to any disclaimer, the term of this patent is extended or adjusted under 35 U.S.C. 154(b) by 703 days.

(21) Appl. No.: 13/677,249

(22) Filed: Nov. 14, 2012

(65) Prior Publication Data

US 2013/0139385 A1    Jun. 6, 2013

Related U.S. Application Data

(60) Division of application No. 12/860,716, filed on Aug. 20, 2010, now Pat. No. 8,334,457, which is a continuation-in-part of application No. 12/708,500, filed on Feb. 18, 2010, now abandoned.

(60) Provisional application No. 61/154,316, filed on Feb. 20, 2009.

(51) Int. Cl.
*H01R 43/048* (2006.01)
*H01R 43/00* (2006.01)
(Continued)

(52) U.S. Cl.
CPC .............. *H01R 43/005* (2013.01); *H01R 4/34* (2013.01); *H01R 13/03* (2013.01); *H01R 43/00* (2013.01);
(Continued)

(58) Field of Classification Search
CPC .......... H01R 4/34; H01R 13/00; H01R 43/00; H01R 43/005; H02K 5/225; H02K 9/19; Y10T 29/49117; Y10T 29/49174; Y10T 29/4913
See application file for complete search history.

(56) References Cited

U.S. PATENT DOCUMENTS 3,721,942 A    3/1973 Conway
3,850,501 A *  11/1974 Butterfield ............. H01B 17/58
                                                  439/196

(Continued)

FOREIGN PATENT DOCUMENTS

JP    H01501994 A    7/1989
JP    H06042514 A    2/1994

(Continued)

OTHER PUBLICATIONS

European search report and search opinion dated Mar. 19, 2014 for EP Application No. 11818764.

(Continued)

*Primary Examiner* — Carl Arbes
(74) *Attorney, Agent, or Firm* — Wilson Sonsini Goodrich & Rosati

(57) ABSTRACT

The invention provides systems and methods for power connection, which may be a sealed power connection. The sealed power connection may be used with an electric machine or any device that may require electrical and/or mechanical connection for power. The sealed power connection may provide an effective electrical connection while providing a robust mechanical connection. The electric machine or device may be fluid-sealed and/or fluid-cooled. The sealed power connection may provide for electrical insulation of the connection from the machine or device enclosure, and may also be sealed to provide for fluid sealing and/or internal fluid cooling of the electric machine or device, as well as fluid cooling of the connection.

12 Claims, 8 Drawing Sheets

(51) Int. Cl.
*H01R 4/34* (2006.01)
*H01R 13/03* (2006.01)
*H02K 5/22* (2006.01)
*H02K 9/19* (2006.01)

(52) U.S. Cl.
CPC *H02K 5/225* (2013.01); *H02K 9/19* (2013.01); *Y10T 29/4913* (2015.01); *Y10T 29/49117* (2015.01); *Y10T 29/49144* (2015.01); *Y10T 29/49174* (2015.01)

(56) References Cited

U.S. PATENT DOCUMENTS

| | | | |
|---|---|---|---|
| 4,362,351 A * | 12/1982 | Wible | H02K 5/225 439/738 |
| 4,561,708 A | 12/1985 | Sorlien et al. | |
| 5,953,201 A | 9/1999 | Jakoubovitch | |
| 5,967,852 A | 10/1999 | Follingstad et al. | |
| 6,328,860 B1 | 12/2001 | Romine et al. | |
| 6,764,110 B2 | 7/2004 | Russell | |
| 6,840,545 B2 | 1/2005 | Schulte-Ladbeck et al. | |
| 7,038,339 B2 * | 5/2006 | Gandrud | H02K 5/225 310/71 |
| 7,163,419 B2 | 1/2007 | Stanford | |
| 7,431,351 B2 | 10/2008 | Russell | |
| 7,465,177 B2 | 12/2008 | Wood | |
| 7,494,389 B1 | 2/2009 | Essert et al. | |
| 8,334,457 B2 | 12/2012 | Garriga et al. | |
| 2002/0127900 A1 | 9/2002 | Goodwin et al. | |
| 2003/0092289 A1 | 5/2003 | Otsu | |
| 2005/0202720 A1 | 9/2005 | Burke et al. | |
| 2008/0160840 A1 | 7/2008 | Bax et al. | |
| 2008/0171461 A1 * | 7/2008 | Jackson | H01R 4/5025 439/275 |
| 2009/0280679 A1 | 11/2009 | Chang | |
| 2010/0216332 A1 | 8/2010 | Garriga et al. | |
| 2010/0319949 A1 | 12/2010 | Fried et al. | |
| 2011/0045686 A1 | 2/2011 | Garriga et al. | |

FOREIGN PATENT DOCUMENTS

| | | | |
|---|---|---|---|
| JP | 2004106468 A | 4/2002 | |
| JP | 2002271947 A | 9/2002 | |
| JP | 2009088913 A | 4/2009 | |
| JP | 2010157406 A | 7/2010 | |
| TW | 201042860 A | 12/2010 | |
| WO | WO 2010/096590 A2 | 8/2010 | |

OTHER PUBLICATIONS

Office action dated Jan. 4, 2012 for U.S. Appl. No. 12/860,716.
Office action dated Dec. 6, 2012 for U.S. Appl. No. 12/708,500.
International search report and written opinion dated May 29, 2012 for PCT Application No. US2011/048208.
International search report dated Sep. 30, 2010 for PCT Application No. US2010/24630.
Notice of allowance dated Aug. 17, 2012 for U.S. Appl. No. 12/860,716.

* cited by examiner

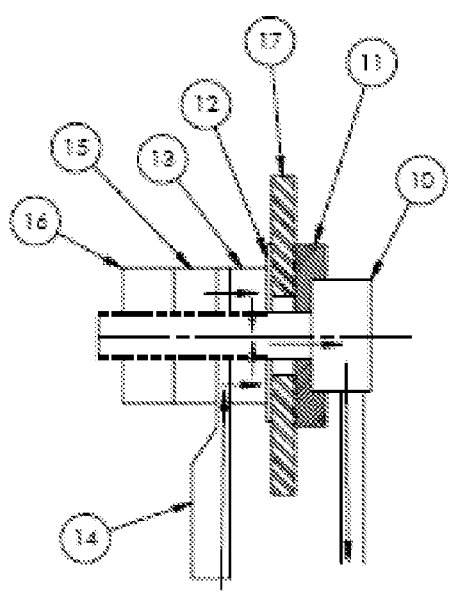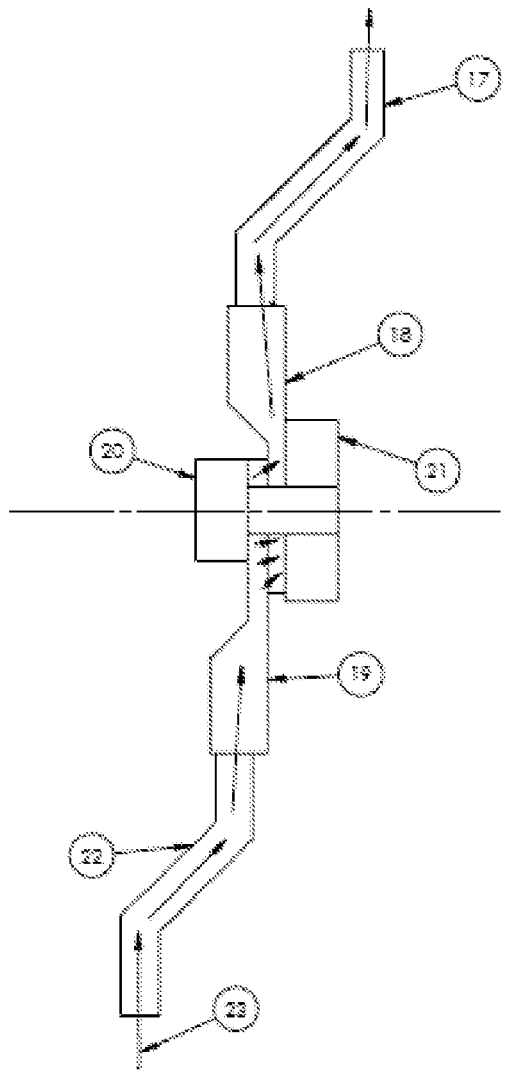
Figure 5A                    Figure 5B

METHOD FOR MAKING A POWER CONNECTION

CROSS-REFERENCE

This application is a divisional of U.S. Ser. No. 12/860,716, filed on Aug. 20, 2010, which is a continuation-in-part application of U.S. Ser. No. 12/708,500, filed Feb. 18, 2010, to which application we claim priority under 35 USC §120, and which claims the priority of U.S. Provisional Application Ser. No. 61/154,316, dated Feb. 20, 2009 which are incorporated herein by reference in their entirety.

BACKGROUND OF THE INVENTION

High power electric machines and other high power electric devices require robust power connections capable of reliably transferring high currents and insulating high voltages. In the case of fluid-sealed machines or devices, the connection also requires sealing against the machine or device enclosure to prevent fluid from entering or exiting the enclosure through any of the connection interfaces. In the case of internally fluid-cooled machines or devices, the connection requires sealing against the machine or device enclosure to prevent leakage of cooling fluids.

One traditional method used for making power connections to electric machines is to provide a threaded stud constructed of material with relatively high electrical conductivity, such as copper or brass, connected to the internal wiring of the machine. With this method, as illustrated in FIG. 1, the threaded stud 10 is inserted through an insulated block 11. The assembly is then inserted through the machine housing wall 17 and captured with an insulated washer 12 and locking nut 13. The power connection is completed by securing the power cable ring lug connector 14 with additional locking nuts 15, 16 which apply pressure against the other locking nut 13.

One drawback for this stud connection design is that the threaded stud 10 and locking nut 13 need to be constructed of material with relatively high electrical conductivity, especially when used in high current applications. However, materials with high electrical conductivity tend to also have low mechanical yield strength properties, making them prone to failure when threaded hardware is used to secure the electrical connection, and thus may not survive many assembly and disassembly cycles without damage.

Additionally, another drawback of a traditional stud connection design is that the electrical current must flow through the threads of the locking nut 13 to the threads of the stud 10 to complete the electrical circuit, providing only limited line contact and not much surface area contact. This is especially troublesome in high current applications, where the limited electrical contact may result in additional resistive losses that may lead to overheating of the connection.

Another traditional method for making power connections is the terminal connection or "flying lead" method. This method, as shown in FIG. 2, involves terminating the internal wiring of an electric machine 17 directly with a ring lug connector 18. The external power connection cable for the machine is also terminated with a ring lug connector 19. These ring lug terminations 18, 19 are then connected together with a threaded fastener 20 and nut 21, or with a threaded fastener 20 to a terminal strip acting as the nut. The threaded fastener 20 and nut 21 apply pressure between the contacting surfaces of the ring lug connectors 18, 19 to complete the electrical path.

This method allows for an improved electrical connection over the stud connection design, because pressure is applied between the two large surfaces of the ring lug connectors 18, 19. This produces an effective connection with low resistance and high current capacity.

However, with the terminal connection method, because the two sets of wires are directly connected external to the machine, a method is needed to seal the wires as they exit the machine through the machine housing or other enclosure wall in the case of a fluid-sealed machine. In this case, the entire connection may need to be accessible, yet may also need to be contained in some type of sealed enclosure, making this design approach undesirable where a compact form factor is important.

Thus, a need exists for a method of high power connection that may achieve a robust electrical and mechanical connection interface. A further need exists that may addresses the issue of sealing the connection for fluid-sealed and/or internally fluid-cooled machines or devices.

SUMMARY OF THE INVENTION

The invention provides systems and methods for power connection, such as sealed power connection. Various aspects of the invention described herein may be applied to any of the particular applications set forth below or for other types of power connections that may require electrical and/or mechanical connection. The invention may be applied as a standalone system or method, or as part of an application, such as providing connections for high power electric machines, which may also be fluid-cooled machines. It shall be understood that different aspects of the invention can be appreciated individually, collectively, or in combination with each other.

In accordance with one aspect of the invention, the power connection may provide an efficient electrical and robust mechanical connection. The power connection may include a power cable connector that may be configured to contact a power connection block. The power cable connector and power connection block may be formed of electrically conductive materials. The power cable connector and power connection block may contact one another over a relatively large surface area, and may be electrically and mechanically connected. The power connection may include a fastener assembly formed of a relatively high strength material. The fastener assembly may be mechanically connected to the power connection block, and may be used to apply pressure to form the connection between the power cable connector and power connection block. The fastener assembly may provide a robust mechanical connection, but need not be part of the electrical connection formed by the power cable connector and the power connection block.

In accordance with an aspect of the invention, a power connection may be provided. The power connection may comprise a fastener assembly formed of a material with a first strength ($S_1$) and a power connection block formed of a material with a second strength ($S_2$), wherein the fastener assembly is mechanically connected to the power connection block, and wherein ($S_1$) is greater than or equal to ($S_2$). In some embodiments, the power connection block may be formed of a material with a first electrical conductivity ($EC_1$) and the fastener assembly may be formed of a material with a second electrical conductivity ($EC_2$), wherein ($EC_1$) is greater than or equal to ($EC2$).

In accordance with another aspect of the invention, the power connection block may be fluid-cooled. For instance, the sealed power connection may be used for an electric machine or device that may have internal fluid cooling. The cooling fluid may contact the power connection block.

The sealed power connection may also provide insulating and sealing configurations in accordance with another aspect of the invention. An insulator may electrically insulate the connection provided between the power cable connector and the power connection block from the enclosure of an electric machine or device. The design may also provide a sealed connection that may prevent cooling fluid used to cool the power connection block, or other fluids within the electric machine or device, from leaking out of the electric machine or device, or may prevent any other fluids from entering or exiting the machine or device.

Another aspect of the invention may be directed to a method of making power connections to an electric machine. The method may include providing a power connection block in electrical communication with an internal component of the electric machine; contacting a power cable connector to the power connection block; and providing a fastener assembly, wherein the faster assembly holds the power cable connector against the power connection block, and wherein a greater amount of electric current flows through the power cable connector and the power connection block than through the fastener assembly. In some embodiments, the fastener assembly may comprise an insert, which may be positioned within the power connection block, and a mechanical fastener, which may be a threaded fastener and which may be screwed in to the insert.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5A shows current flow through a traditional stud connection method.

FIG. 5B shows current flow through a traditional terminal connection.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for power connection (also referred to herein as a sealed power connection, although some embodiments may not require the power connection be sealed). The power connection may be used in any application, including, but not limited to, electric machines or devices that may require electrical and/or mechanical connection for power. For example, power may be provided by a power source, which may be external or internal to the electric machine or device, and may be transferred through the power connection to or from the internal wiring or components of the electric machine or device. Thus, power connections may be used in any type of electric machine or electric/electronic device application.

Figure 1:
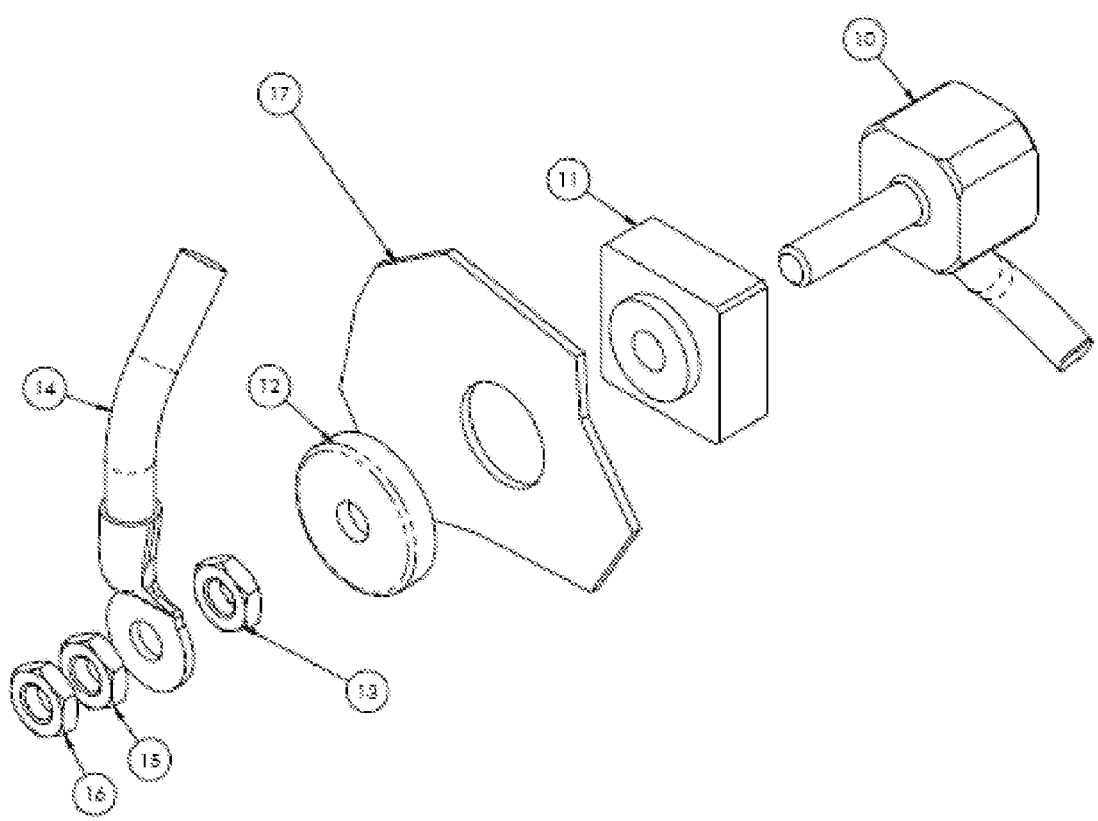
FIG. 1 shows a traditional stud connection.
Figure 2:
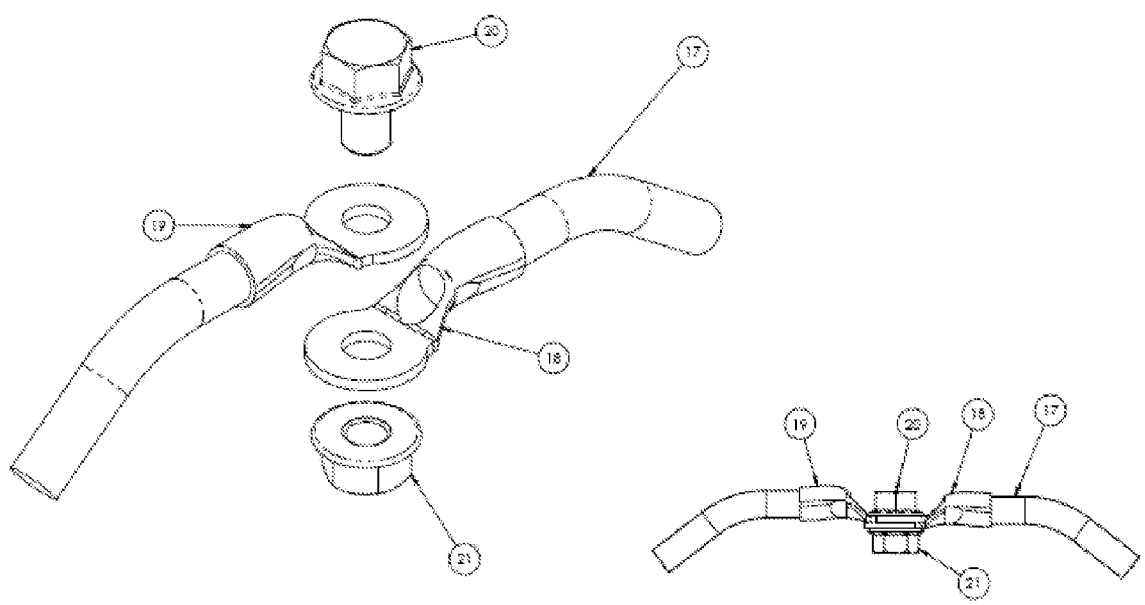
FIG. 2 shows a traditional terminal ("flying lead") connection.
Figure 3A:
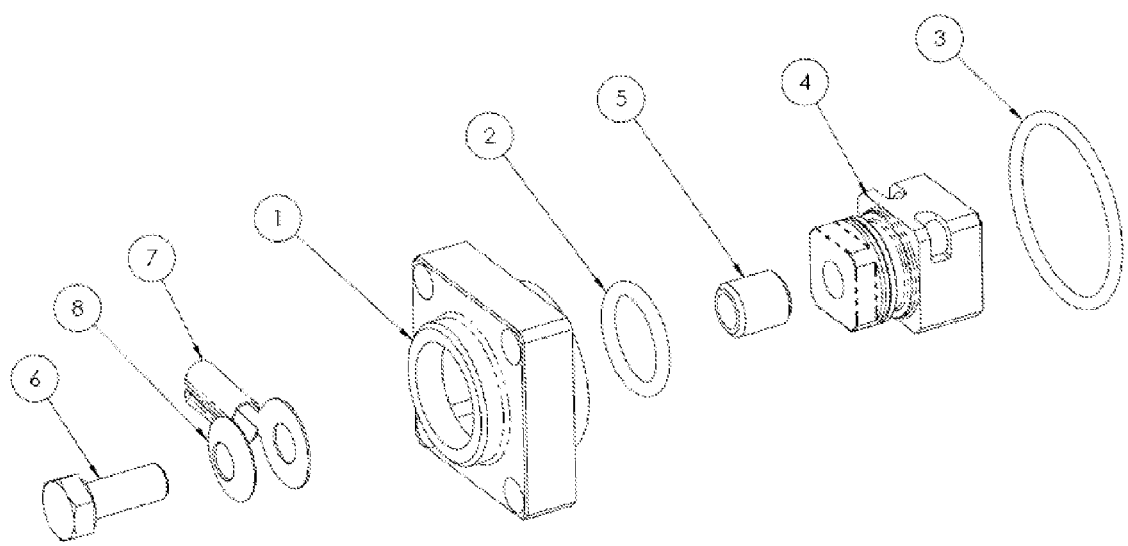
FIG. 3A shows an exploded view of a sealed power connection in accordance with one embodiment of the invention.

FIG. 3A shows an exploded view of a sealed power connection in accordance with one embodiment of the invention. For instance, a threaded fastener 6 may be tightened against a washer 8, which may come into contact with a power cable connector 7. The power cable connector 7 may come into contact with a power connection block 4, which may be formed from material with high electrical conductivity. The power connection block 4 may include a high strength insert 5, which may be formed from a high yield strength material such as steel, that may provide mechanical support and/or connection for the threaded fastener 6. Additionally, an insulator 1, which may be formed of a dielectric material, as well as one or more seals 2, 3 may come into contact with the power connection block 4 and/or insulator 1.

1. Electrical and Mechanical Connection

A sealed power connection assembly may include components that may primarily provide an electrical connection and components that may primarily provide a mechanical connection. For example, a sealed power connection assembly may include an electrical connection assembly that may include a power cable connector 7 and a power connection block 4, as well as a mechanical connection assembly that may include an insert 5 and a fastener 6. A sealed power connection may include both electrical and mechanical connection components, such that the power connection may provide an effective electrical connection as well as a robust mechanical connection.

The sealed power connection may provide an advantageous design for an electrical connection in accordance with one aspect of the invention. An electrical connection may be accomplished by surface pressure contact between the power cable connector 7 and the power connection block 4. The power cable ring lug connector and/or power cable connector, referred to herein, may be any type of power connection component or mechanism known in the art that may contact the power connection block for the purpose of transferring electrical power to and/or from the connection block. In some embodiments, the power connection component or mechanism may or may not be in electrical communication with a power cable, but may also be part of and/or transfer power from any type of structure or component known in the art that may be capable of conducting and/or transferring power, such as bus bar.

The power connection block 4 may be constructed from material with high electrical conductivity. For example, the power connection block may be formed of a material which may have an electrical conductivity of $10 \times 10^6$ S/m or greater, $30 \times 10^6$ S/m or greater, or $50 \times 10^6$ S/m or greater. In some instances, the power connection block may be formed of copper, brass, silver, gold, aluminum, or any combinations or alloys thereof. The power connection block may be plated, clad, or include layers or components of various materials, including elemental metals. The power connection block may be formed of, or may include, an elemental metal or any other electrically conductive material. The power connection block may be connected to the internal wiring or components of an electric machine or device. The power connection block may be connected to the internal wiring or components by any type of electrical connection known in the art or later developed. For example, the power connection block may be connected to the internal wiring or components by soldering, welding, brazing, swaging, adhesives, pressure connections, or any form of mechanical connection, such as a threaded fastener, terminal strip, or any form of insert.

A mechanical fastener 6 may provide pressure between the power connection block 4 and the power cable connector 7. In some embodiments of the invention, the pressure provided by the mechanical fastener may be constant or substantially constant.

This sealed power connection may allow for a relatively large surface contact area for the connection interface in a compact space. For instance, the interface between the power cable connector 7 and the power connection block 4 may be relatively large as compared to an interface that may be provided by threads of a fastener. The sealed power connection design may enable the contact area for the interface between the power connection block and the power cable connector to be selected to support a desired amount of current flow. In some instances, a relatively large contact area may be selected to support a relatively high current flow. In one example, the contact area between the power cable connector and the power connection block may be about 0.1 $cm^2$ or greater, 0.5 $cm^2$ or greater, 1 $cm^2$ or greater, 2 $cm^2$ or greater, 3 $cm^2$ or greater, 4 $cm^2$ or greater, 5 $cm^2$ or greater, or 100 $cm^2$ or greater. In some other examples, the contact area may be greater than or equal to one tenth, one eighth, one quarter, one half, five eighths, three quarters, seven eighths, nine tenths, or may cover substantially all of the side of the power connection block that is in contact with the power cable connector.

For example, with this design, a connection using a 19 mm circular power cable ring lug connector 7 with a 10 mm threaded fastener 6 may be capable of transferring over 1600 A peak current in a three-phase AC induction machine application, without exceeding generally acceptable thermal limitations of the connection. Additionally, the power connection block 4 may be cooled by fluid contacting the power connection block on the indicated area shown in FIG. 3B, which may further increase the current transferring capability of the connection, to be discussed in greater detail below.

The sealed power connection may also provide an advantageous design for a robust mechanical connection in addition to the advantageous design for the electrical connection. Generally, achieving optimal electrical and thermal performance for a high power connector requires the use of materials which have high electrical conductivity. However, materials with high electrical conductivity usually tend to also have low mechanical yield strength properties, making them prone to failure when threaded hardware is used to secure the electrical connection. The sealed power connection, in accordance with an embodiment of the invention, may resolve this problem by the addition of a high yield strength material, which may not be part of the primary electrical circuit.

The reliability of the clamping interface for the sealed power connection may be enhanced by the use of a high strength steel insert 5, or insert of other relatively high yield strength material, assembled into the high electrical conductivity material which may compose the power connection block 4. For instance, the insert may be formed of plain high carbon steel AISI 1060 0.6% carbon, structural steal alloy ASTM A36, high strength alloy ASTM A514, high tensile prestressing strands, stainless steel AISI 304, or any other types of steel. Furthermore, in addition to steel, the high strength insert may be formed of any other material with the desired mechanical strength properties, including, but not limited to, titanium, bronze, aluminum, brass, tungsten, aramid (Kevlar or Twaron), nickel-chromium alloy (Inconel X750), or combinations or alloys thereof (e.g., titanium alloy (6% Al, 4% V), aluminum alloy 2014-T6). The insert 5 need not have high electrical conductivity, and thus may be formed from any material with the desired mechanical strength properties, which may be electrically conductive or electrically non-conductive. In some embodiments, the insert may have a yield strength of 100 MPa or greater, 300 MPa or greater, 500 MPa or greater, 800 MPa or greater, or 1000 MPa or greater.

In a preferable embodiment of the invention, the insert may be threaded on the inside to allow the threaded fastener 6 to connect with the internally threaded portion of the insert. Since the fastener 6 and/or the insert 5 may be formed of a high strength material, this may enable a strong, robust mechanical connection. For instance, the use of high strength materials may enable tightening of the threaded fastener without damaging the threads of the fastener. This may enable the connection to survive many assembly and disassembly cycles with relatively little or no damage. In some embodiments, the fastener 6 may be formed of the same material or a different material from the insert 5. In some embodiments, the fastener may be formed of a high strength material, such as those described for the insert. The fastener 6 need not have a high electrical conductivity, and thus may be formed from any material with the desired mechanical strength properties, which may be electrically conductive or electrically non-conductive. Any fastener assembly may be provided. In some instances, the fastener assembly may comprise an insert and/or a fastener.

In some embodiments, the power cable connector 7 and/or the power connection block 4 may be formed of material of a higher electrical conductivity than material used to form the fastener 6 and/or insert 5. For example, the power connection block may have an electrical conductivity ($EC_1$), which may be greater than the insert's electrical conductivity ($EC_2$) and greater than the fastener's electrical conductivity ($EC_3$). Furthermore, the electrical conductivity of the power connection block may be greater than the electrical conductivity of any type of fastener assembly that may be used with the connection.

Also, in some embodiments, the fastener 6 and/or the insert 5 may be formed of material of higher strength than material used to form the power cable connector 7 and/or the power connection block 4. In one implementation, a fastener assembly may be formed of one or more materials of higher strength than the material used to form the power cable connector and/or power connection block. For example, a fastener assembly may have a strength $S_1$ and the power connection block may have a strength $S_2$, and $S_1$ may be greater than or equal to $S_2$. Similarly, a power cable connector may be formed of a material of strength $S_3$, and $S_1$ may be greater than $S_3$. The fastener assembly may include an insert formed of a material of strength $S_a$, and a mechanical fastener may be formed of a material of strength $S_b$, where at least one of $S_a$ or $S_b$ are greater than or equal to at least one of $S_2$ or $S_3$.

A threaded fastener 6 may be able to be repeatedly tightened against a washer 8 and power cable connector 7, without damaging the threads or compromising the performance of the power connection block 4. In some instances, a serrated Belleville washer may be used, which may function as a locking mechanism for the fastener. The use of a serrated Belleville washer 8 with the connection may have several advantages, including: 1) it may provide a constant spring clamping force as the joint may heat or cool and expand or contract during operation, and 2) the serrated Belleville washer may dig into the mating materials to resist rotation, and may thus prevent loosening of the connection interface due to vibration and other dynamic fatigue.

In some embodiments, other connection configurations may be used. For example, a fastener 6 may be tightened against the power cable connector 7 without the use of a washer. For instance, the fastener 6 may directly contact the power cable connector 7. Alternatively, other components may be included in the place of, or in addition to, a washer. Any type of fastener locking method or mechanism known in the art may be used with the connection. For example, some form of spring structure, or elastic material may provide a constant or substantially constant clamping force. Any other components may be used that may assist with the mechanical connection.

In an alternate embodiment of the invention, a fastener 6 may not need to be threaded, but may have another connection mechanism that may enable it to connect to an insert 5. Any mechanical connection configuration known in the art may be used. For example, the fastener and insert may have some sort of lock and groove mechanism that may provide a robust mechanical connection. The fastener could also somehow snap into the insert, or may have a toothed configuration, that may enable the fastener to slide in and engage with the insert, but may prevent it from disengaging. The fastener and the insert may have a configuration that may allow the mechanical assembly and disassembly between the fastener and the insert.

Preferably, an insert 5 may be affixed to the power connection block 4. The insert may be positioned within the power connection block. In one embodiment, a threaded insert may be screwed into the power connection block. A connection block assembly may include components that may primarily involve an electrical connection, such as the power connection block 4 and components that may primarily involve a mechanical connection, such as the insert 5. The insert may be affixed to the block by any of the mechanisms or methods known in the art or discussed relating to fastening components. For example, the insert may have external threads that may allow it to screw into or mate with corresponding threads on the interior of the power connection block, or any other mechanical locking device may be used. The insert may be a key locking insert (Keenserts) or a helical insert (Heli-Coil). In another example, the insert may be a captive nut or mechanically fastened to the power connection block based on the shape of the insert and/or power connection block. For example, the power connection block may have a lip or component that may prevent the insert from sliding out. The insert may be self-tapping or pressed into the power connection block. In other embodiments, the insert may be welded, brazed, or soldered into the power connection block.

The insert 5 may be a tubular insert. For example, the insert may have a substantially cylindrical exterior. The exterior of the insert may be smooth, threaded, ridged, or have any texture. The interior of a tubular insert may have internal threads that may enable it to mechanically connect to the fastener. The insert could also include any other mechanical locking device known in the art. The insert may be a screw or locking fastener, which may or may not include threads. The insert may also have a shape, such as a square shape, or other geometric shape, protrusion or indentation, and the interior of the power connection block may have a corresponding shape that may prevent the insert from rotating or otherwise moving within the power connection block. In some embodiments, the insert may be affixed to the power connection block by additional mechanical components or devices that may secure the insert to the power connection block, or by adhesives, locking compounds or materials, or any other affixing means known in the art.

2. Fluid Cooling

Another aspect of the invention may also provide a sealed power connection that may advantageously allow for fluid cooling of the connection. The use of fluid to cool the power connection block 4 may provide two distinct advantages over prior art designs:

1) The cooling fluid may remove heat from the power connection block 4, which may lower the operating temperature of the connection. This may not only lower the average temperature of the power connection block 4, but may also lower the peak hot spot temperature. Thus, fluid cooling of the connection may provide for a higher peak current density rating for the connection and may also improve the performance and reliability of the connection at any given continuous current density. The lower operating temperature may also lower the electrical resistance of the connection, which may provide for a more efficient power connection.

2) The active cooling may reduce temperature fluctuations and may maintain a more constant operating temperature of the connection. Reducing temperature fluctuations may reduce the stress on the mechanical joint (e.g., between the fastener 6 and the washer 8 or power cable connector 7) and may thus improve reliability of the connection, as thermal expansion and contraction of the connection materials may be reduced.

Figure 3B:
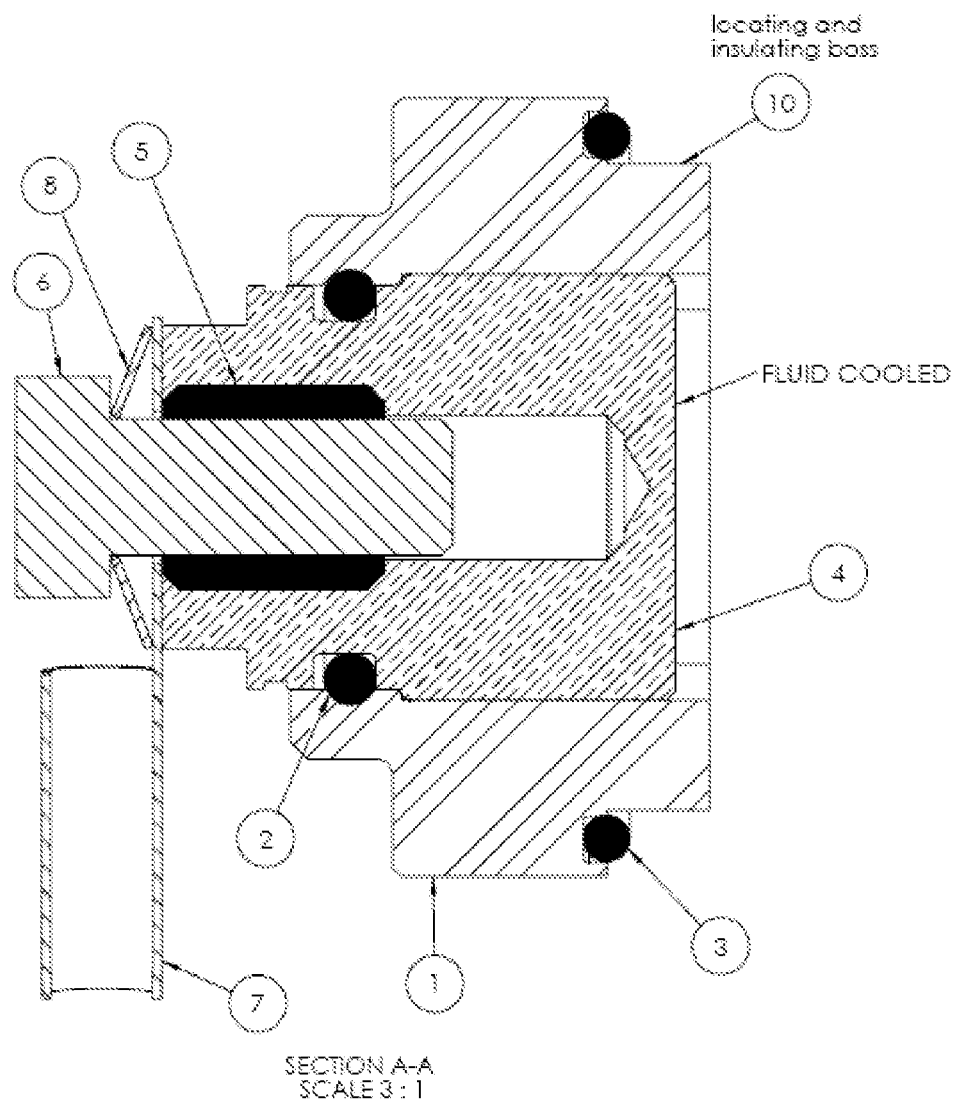
FIG. 3B shows a cross-sectional view of a sealed power connection in accordance with one embodiment of the invention.

FIG. 3B shows a cross-sectional view of a sealed power connection in accordance with one embodiment of the invention. As indicated, the power connection block 4 may be cooled by a fluid. The fluid may directly contact the power connection block. Fluid may or may not be flowing where the fluid is contacting the power connection block. In some embodiments, the fluid may contact the surface of the power connection block opposite the threaded fastener. In some embodiments, the fluid does not contact the threaded fastener, insert, or any part of the fastener assembly. Alternatively, the fluid may contact one or more components of the fastener assembly. The sealed power connection may also be designed such that fluid may also contact the power connection block on other portions of its surface, including external and/or internal surfaces, which may include passages or cavities within the connection block.

The fluid may be flowing against one or more surfaces that it contacts and/or the fluid may be substantially stationary in contact with one or more surfaces. The fluid may flow perpendicular to or along any surface that it contacts. The fluid may flow at any angle to any surface that it contacts. The rate of fluid flow may or may not be adjusted or controlled to provide a desired amount of cooling or temperature control. For example, a fluid flow rate may be increased to increase the rate of cooling of the connection. In some instances, any surface area of the power connection block that the fluid may contact may be designed to support a desired amount of heat transfer.

In some embodiments, the fluid may be contained within an enclosure of an electric machine or device. In other embodiments, the fluid may or may not be provided from a source external to the electric machine or device. In some embodiments, the fluid may be substantially stationary within the machine or device enclosure. Alternatively, it may move or circulate within the machine or device, while contained within the enclosure, or may circulate external to the machine or device as well.

The cooling fluid may be any fluid known in the art. In some embodiments, the cooling fluid may be a gas, such as air; or a liquid, such as water, oil, or a liquid dielectric fluid; or a vapor or mist of any such fluids; or any other fluid. For instance, a transmission fluid, such as automatic transmission fluid (ATF) may be used. A fluid may be selected according to desired thermal, electrical, chemical, or flow properties.

In some embodiments, one or more surfaces of the power connection block may include one or more features that may aid in heat transfer, such as fins, grooves, channels, ridges, protrusions, bumps, indentations, patterns, textured surfaces, or any other surface feature. This may increase the exposed surface area of the connection block, which may increase the amount of surface area in contact with a fluid. This may advantageously provide for a greater degree of heat transfer between the connection block and the fluid. In some instances, surface features may assist with directing or channeling the fluid flow over and/or around various surfaces of the connection block. Alternatively, one or more of the connection block surfaces may be smooth or substantially smooth.

3. Insulating and Sealing Design

The sealed power connection may allow for a robust insulator and sealing design and method in accordance with another aspect of the invention. The power connection block 4 may be electrically insulated from a machine or device enclosure. For example, the sealed power connection may be used with an electric machine that may have a housing formed of an electrically conductive material. Because electric machines may operate at voltages in excess of 400 V AC peak, an adequate insulation path may be needed between the machine housing and the power connection block 4.

The insulator 1 may be formed of a dielectric material. In some embodiments, a fiberglass composite material may be used, such as FR-4 glass reinforced epoxy or any other type of fiberglass reinforced epoxy laminate. Any other electrically insulating material may be used. For example, some preferable materials may include, but are not limited to, ceramic, glass, plastic, epoxy resin, synthetic resin bonded paper (SRBP, FR-1, and FR-2), epoxy-glass materials, or any combination thereof. The insulator may be formed substantially of a dielectric material or may include a dielectric coating or layer.

Figure 3C:
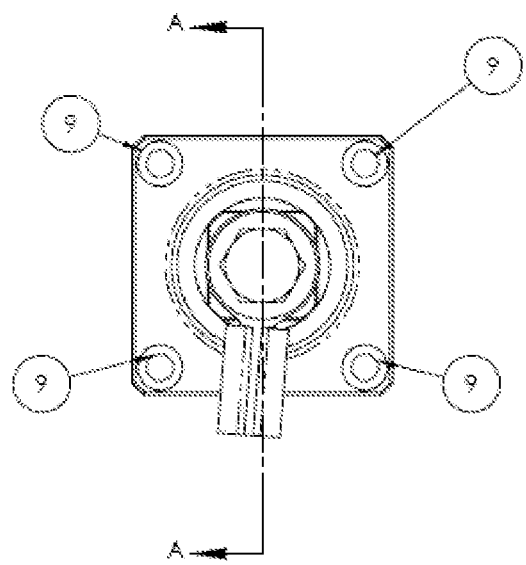
FIG. 3C shows an exterior view of a sealed power connection in accordance with one embodiment of the invention.

FIG. 3C shows an exterior view of a sealed power connector in accordance with one embodiment of the invention. The term "exterior" may be provided by way of reference only and shall not limit the placement or orientation of a sealed power connector. For instance, a sealed power connector may be fastened to an electric machine, and part of the sealed power connection may be exposed to the exterior of the machine. Alternatively, the opposite side of the sealed power connection may be exposed to the exterior of the machine. In other embodiments, any side or sides, or portion of any side or sides, of a sealed power connection may be within a machine, external to the machine, or exposed to the exterior of the machine.

The insulator may be fastened to a surface of an electric machine or device. For example, the sealed power connection design may provide secure clamping of the insulator 1 by multiple threaded fasteners 9 onto a machine surface. Any number of threaded fasteners may be provided, such as four fasteners. In other implementations, the insulator may be fastened to the machine surface by any other designs or methods known in the art including, but not limited to, screwing it into the machine housing, having some sort of mechanical connection such as a snapping configuration, having an interlocking configuration, using rivets, using nuts, using some sort of clamp, using an adhesive or epoxy or any other fastening mechanisms or methods known in the art. Any robust method of attachment may be used to secure the insulator to any surface of a machine or device.

The sealed power connection may enable the connection to be fluid cooled while also providing a sealing design and method that may prevent cooling fluid leakage, or may prevent any other fluid from entering or exiting through the connection interfaces. For example, one or more seals 2, 3 may be provided. Any type of sealing mechanism or configuration known in the art may be used. For example, the seals may be o-rings and may be placed as shown in FIG. 3B. Alternatively, the seals may be placed at any other location that may prevent fluid leakage. The seals may also be formed of other materials such as a putty, caulking, or filling materials.

The insulating and/or sealing of the sealed power connection may be enhanced by the shape of the insulator 1 and/or power connection block 4. For example, the insulator 1 may have square features on its inside surface, which may interface with squares features on the outside of the power connection block 4, which may prevent rotation of the power connection block 4. For example, as shown in FIG. 3A, the power connection block 4 may include one or more square shaped features. Corresponding square shaped features on the interior of the insulator 1 may match the square shaped features of the power connection block 4 to provide a substantially snug connection that may not allow the two parts to rotate or otherwise move relative to one another. These features may advantageously prevent loosening or damage of the connection interfaces during assembly of the mechanical connection and/or when the connection may be used in applications where the connection may be exposed to vibration or repetitive motion.

In some embodiments, the power connection block and/or insulator may have other shapes. For example, a power connection block may have a hexagonal shape or feature, and the insulator may have a corresponding hexagonal shape on its interior. In some instances the power connection block may have any concave or convex shape and a corresponding shape may be provided by the insulator interior. In some implementations, the power connection block may have a shape that may rotate but may have a feature that may prevent it from rotating; e.g., the power connection block may have a circular shape but may have a protrusion or indentation that may correspond to the shape of the insulator interior that may prevent it from rotating.

The relative shapes of the power connection block and the insulator may not match up entirely in some embodiments of the invention. For example, the power connection block and insulator may have shapes that may match up to some extent to prevent rotation, but may have additional features that may provide gaps between the power connection block and insulator interface. For example, both a power connection block and insulator may have a square shape on its exterior and interior respectively, but the power connection block may provide grooves or other features that may enable fluid to flow between a portion of the power connection block and insulator and thereby provide additional surface area to cool the power connection block. Grooves or gaps may also be provided between the insulator and power connection block that may be used for other purposes, such as connection to internal wiring.

The insulator may also include a retaining feature that may locate the power connection block 4 by means of a retaining ring, fastener, or any other method know in the art, so as to capture the power connection block 4 into the insulator 1. Thus, the retaining feature may engage the power connection block in position with regard to the insulator and may prevent the power connection block from disengaging from the insulator. The insulator may also include locating features 10 on the insulator, which may insulate the passage of the connection through a machine or device enclosure wall, as well as locate the insulator and connection assembly onto the machine or device enclosure surface.

Figure 3D:
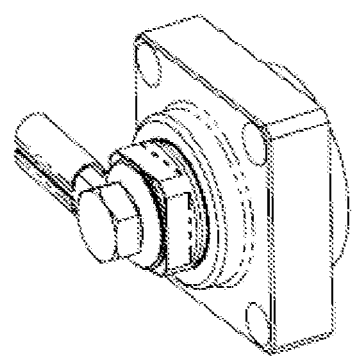
FIG. 3D shows a perspective view of a sealed power connection in accordance with one embodiment of the invention.

FIG. 3D provides a perspective view of a sealed power connection as it may appear when assembled in accordance with one embodiment of the invention.

4. Electric Machine

The sealed power connection may be used to make power connections to an electric machine. In some embodiments of the invention, the electric machine may be a motor, such as a three-phase AC induction motor. Alternatively, the electric machine may be any sort of motor, generator, or any sort of machine that may require some form of electrical and mechanical power connection. In some embodiments, the connection may provide power from a source external to the machine to one or more components inside machine, or the connection may provide power from a source within the machine to one or more devices outside the machine. In other embodiments, the connection may provide electrical and mechanical connections between any two components which may both be external to the machine or within the machine.

The electric machine may also be any machine that may be fluid-sealed or fluid-cooled or that may have some sort of fluid in its interior. In some embodiments, the machine may have fluid for cooling and/or lubrication. The fluid within the electric machine may be flowing or may be substantially stationary. In some embodiments, the fluid within the electric machine may circulate through the electric machine and may come from a source external to the electric machine. In other embodiments, the fluid may be contained within the electric machine and/or may circulate within the electric machine.

The electric machine may utilize high power electrical connections. Reliable high power connections may require low-resistance electrical contact with acceptable current density. Typical maximum current densities in copper DC power connections may be on the order of $2.2 \times 10^6$ A/m$^2$. This may typically limit the temperature rise of the connection to under 30° C. in ambient temperatures over 40° C. See e.g., ANSI C37.20C-1974, IEEE standard 27-1974. In copper three-phase AC power connections, maximum peak current densities of $7 \times 10^6$ A/m$^2$ have traditionally been used in electric machines reliably. In some embodiments of the invention, fluid cooling may be introduced to one or more connector surfaces, which may enhance the connection reliability and which may make it possible to exceed the $7 \times 10^6$ A/m$^2$ value.

Figure 4:
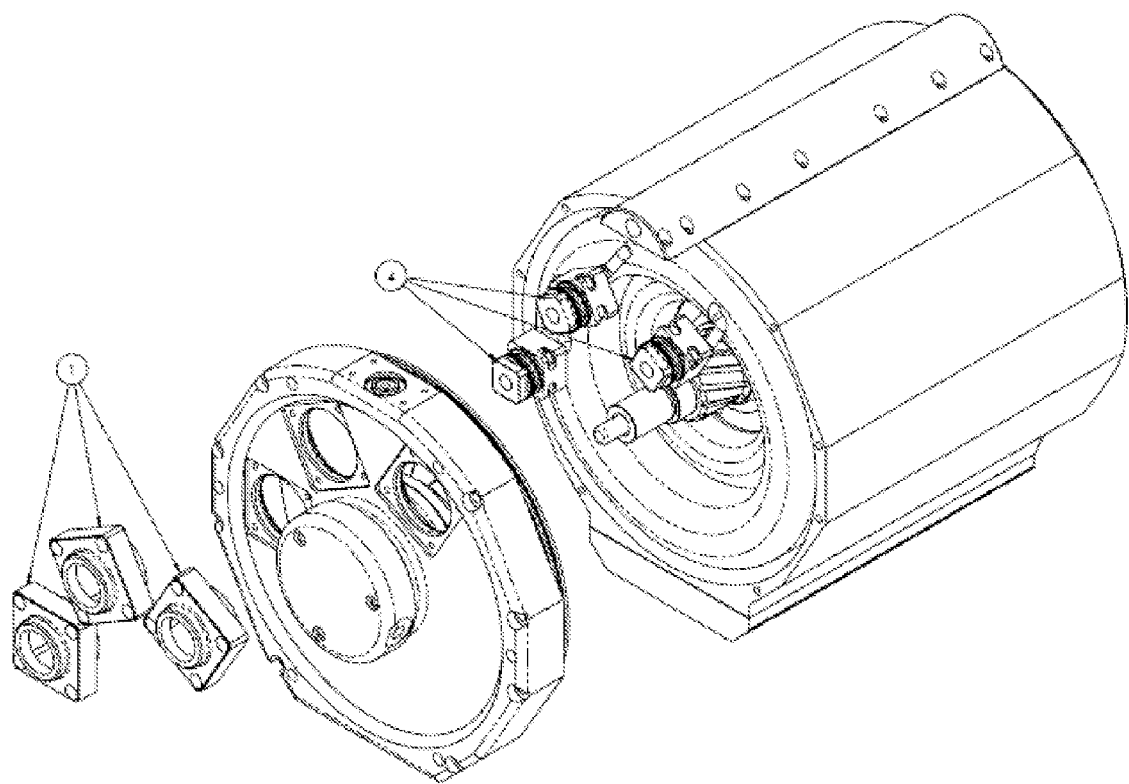
FIG. 4 shows an example of applying a sealed power connection onto an electric machine in accordance with one embodiment of the invention.

FIG. 4 shows an example of applying a sealed power connection onto an electric machine (where some of the fastening hardware may have been excluded for clarity). For example, one or more power connection blocks 4 may be connected to internal wiring of the electric machine. A housing of the electric machine may be provided. The housing may include any and all structures and/or components that may surround all or part of the machine and may perform the function of containment, support, and/or protection, or any other similar functions, for the electric machine or any of the individual components of the electric machine. In some embodiments, all or part of the housing may be fluid-sealed. One or more insulators 1 may be connected to the housing of the electric machine and also to one or more power connection blocks 4. An insulator 1 may be connected to the housing by fasteners (e.g., such as the fasteners 9 shown in FIG. 3C), and may be positioned between the housing and the power connection block 4 to provide an electrically insulating barrier. Thus, the power connection block may be electrically isolated from the electric machine housing. A power cable connector may be contacting the power connection block or in electrical communication with the power connection block. In some embodiments, the power cable connector may be located external to the machine housing.

For example, sealed power connections may be positioned at the end of an electric machine. In some implementations, a plurality of sealed power connections may be arranged to form a roughly circular configuration. Sealed power connections may be placed at one or more sides or surfaces of a machine. In some embodiments, rather than being placed on an external housing of a machine, a sealed power connection may be used within a machine. Any number of sealed power connections may be provided for an electric machine, and may be positioned at any location on and/or within the electric machine.

5. Current Flow

The sealed power connection may provide an advantageous current flow and beneficial design for electrical connection. The sealed power connection may be compared with the current flow of traditional connection methods.

For example, traditionally, many electric machines feature threaded stud type designs for electrical connections. Current flow through these stud connection designs may be illustrated by a schematic as shown in FIG. 5A. For instance, current may flow into a ring lug connector 14, across an interface between the ring lug connector 14 and a locking nut 13, and then through a threaded interface between the locking nut 13 and the threaded stud 10.

As discussed previously, this current flow is undesirable because the current must flow through the mechanical screw threads. The threads provide line contact with much lower surface area contact than larger flat surface interfaces, leading to higher resistance through the connection. Additionally, because of the nature of the traditional stud connection assembly, the current must flow across two or more interfaces. These interfaces may include the interface between the ring lug connector 14 and the locking nut 13, and the interface between the locking nut 13 and the threaded stud 10. Current flow across multiple interfaces may be less desirable, as this method tends to have higher resistance than connection methods which only have a single interface through which current may flow.

The nature of the current path through the threaded interface in a stud connection design may be driven by the need to electrically insulate the connection assembly from the mounting surface of the enclosure wall 17. An insulated washer 12 and insulated block 11 are required to isolate the electric current conducting components from the machine enclosure wall 17 in this stud connection method.

In another example, electrical connections in some electric machines may also be handled by another traditional design that involves directly connecting wire leads from the internal wiring of the machine to the power connection cables. Current flow through this traditional terminal connection or "flying lead" design may be illustrated by the schematic represented in FIG. 5B.

In the traditional terminal connection method, current 23 flows through the power connection cable 22 and into a ring lug connector 19. The wire lead from the internal wiring of the machine 17 is also terminated with a ring lug connector 18. The electrical connection is made by using a threaded fastener 20 and nut 21 to apply pressure between the two ring lug connectors 18 and 19. Current flows across the interface between the two ring lug connectors 18 and 19 and then through wire lead 17 to the internal wiring of the machine.

Although the traditional terminal connection method can be designed to be electrically and mechanically robust, it is difficult to seal and cool. Typically, the terminal connection is contained within a separate junction box, or implemented using a terminal strip attached to the outside of the machine, contained inside an additional accessible enclosure. Difficulty with sealing the wires as they exit the machine or enclosure is a typical problem. The use of an additional enclosure attached to the outside of the machine also adds undesirable extra size, weight, and mechanical complexity to the machine.

This problem may be most significant with regard to power-dense machines. With power-dense machines, large conductors are required to handle the high electrical current, yet the overall size of the machine is much smaller than conventional machines of comparable power. Therefore, a large junction box or connection enclosure can significantly increase the size and weight of the power-dense machine, where compact form factor and low weight are important design criteria. Thus, a traditional terminal connection method may be undesirable in particular circumstances.

Figure 5C:
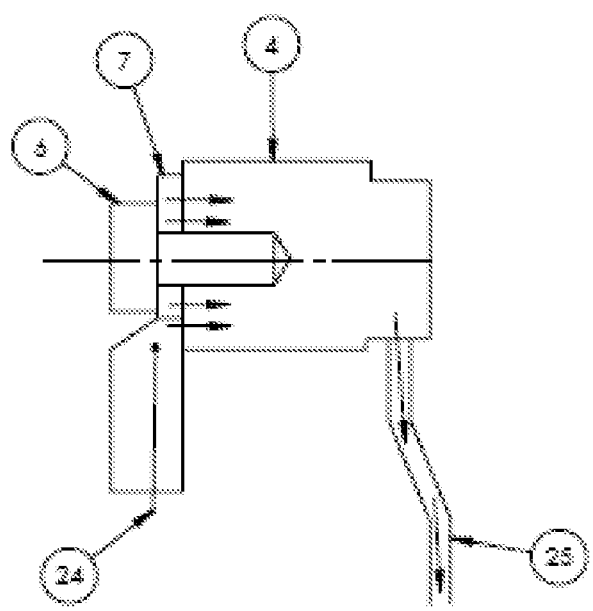
FIG. 5C shows an example of current flow through a sealed power connection in accordance with an embodiment of the invention.

FIG. 5C shows an example of current flow through a sealed power connection in accordance with an embodiment of the invention. The sealed power connection may provide electrical connectivity between a power source and the internal wiring or components of an electric machine or device. The current 24 may flow from an input power cable, or any other power source, into a ring lug connector 7 and across an interface between the ring lug connector 7 and a power connection block 4. A threaded fastener 6 may provide pressure between the ring lug connector 7 and the power connection block 4, which may create a low resistance connection with a relatively high surface area contact. Current may flow across the interface of the ring lug connector 7 and the power connection block 4 to the internal wiring 25 or components of the electric machine or device to apply power to the machine or device.

The sealed power connection design may advantageously include a large surface area contact between the power cable connector 7 and the power connection block 4 which may provide for: 1) high current capacity of the connection interface, 2) a relatively large thermal mass of the power connection block 4 that may absorb and conduct heat away from the connection, and 3) compactness and simplicity of the overall connection assembly.

Also, as discussed previously, the threaded fastener 6 may be constructed of a high yield strength material with low electrical conductivity, because the fastener need not be included in the primary path of the current flow. Additionally, a threaded insert constructed of high yield strength material may also be introduced into the mating threads of the power connection block 4, and may also be separate from the primary current flow path, achieving a highly robust mechanical connection in addition to the excellent electrical connection.

Thus, FIG. 5C may illustrate a method of sealed power connection which may provide electrical connection. The method of sealed power connection may include receiving a current 24 at a connector 7, allowing current flow between the connector and a power connection block 4, and conveying current from the power connection block to internal wiring 25. The method of sealed power connection may also provide mechanical connection. The method of sealed power connection may thus also include providing a fastener 6 that may mechanically connect to an insert 5 that may be mechanically connected to the power connection block 4. The method of mechanical connection may assist with the electrical connection.

The sealed power connection method illustrated in FIG. 5C may advantageously have compact features, and effective electrical contact and current flow. A superior mechanical connection may also be achieved, along with the ability to robustly secure and seal the connection assembly to a machine or device enclosure, as well as provide cooling to the connection when integrated with an internally fluid cooled machine or device.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of making power connections to an electric machine comprising:
   providing a power connection block in electrical communication with an internal component of the electric machine;
   contacting a power cable connector to the power connection block; and
   providing a fastener assembly, wherein the faster assembly holds the power cable connector against the power connection block,
   wherein a greater amount of electric current flows through the power cable connector and the power connection block than through the fastener assembly.

2. The method of claim 1, wherein the fastener assembly comprises an insert and a mechanical fastener.

3. The method of claim 2, wherein the insert is retained within the power connection block.

4. The method of claim 3, wherein the mechanical fastener is a threaded fastener, which is screwed into the insert.

5. The method of claim 1, wherein at least one of the power connection block or the power cable connector is formed of a material with greater or equal electrical conductivity than the material used to form at least one of the components of the fastener assembly.

6. The method of claim 1, wherein at least one of the components of the fastener assembly is formed of a material with greater or equal strength than the material used to form at least one of the power connection block or the power cable connector.

7. The method of claim 1, wherein the power connection block is in contact with a cooling fluid.

8. The method of claim 7, wherein all or part of the electric machine is contained within a machine housing.

9. The method of claim 8, wherein the cooling fluid is within the machine housing.

10. The method of claim 1 further comprising:

providing an insulator in contact with the power connection block, wherein all or part of the electric machine is contained within a machine housing, and wherein the insulator is capable of electrically insulating the power connection block from the machine housing for the power connection.

11. The method of claim 10, wherein the power cable connector is located exterior to the machine housing.

12. The method of claim 10, wherein the insulator and power connection block are sealed, such that fluid is prevented from leaking through the interface between the power connection block and the insulator and through the interface between the power connection and the machine housing.

* * * * *